UNITED STATES PATENT OFFICE.

FRITZ HILLE, OF CHISWICK, ENGLAND.

IMPROVEMENT IN PROCESSES FOR TREATING SEWAGE.

Specification forming part of Letters Patent No. 191,853, dated June 12, 1877; application filed November 9, 1876; patented in England March 29, 1876, for 14 years.

*To all whom it may concern:*

Be it known that I, FRITZ HILLE, of Chiswick, in the county of Middlesex, England, engineer, have invented new and useful Improvements in Treating Sewage, which invention is fully set forth in the following specification.

This invention has for its object improvements in treating sewage.

For the treatment of sewage according to my plan no specially-designed tanks are necessary, as any deposit tank or reservoir may be used for the clarification, deodorization, and purification of sewage according to this method. However, in arranging sewage-works, either inland or on or near the sea-coast, it is desirable that a reservoir should be provided of sufficient storage capacity to hold the ordinary night and Sunday flow of sewage, so as to do away with night and Sunday work, which arrangement, from the beginning, will allow of reducing the working expenses. Before the sewage reaches this reservoir a screen ought to be provided in a pen-stock or chamber, easily to be emptied and changed, so as to prevent any heavy substances contained in the sewage from reaching the works, and, further, at the inlet into the reservoir ought to be an iron cage or grating, to be used for the storage of the disinfecting compound in paste form, before it is diluted with water and formed into the disinfecting-fluid, which the sewage, when flowing into the reservoir, gradually dissolves, and so purifies itself. This arrangement prevents any smell arising from the reservoir.

With regard to the arrangements of tanks, filtering-beds, and outlet-chambers, particularly where sewage reaches the outfall-works by gravitation, provision ought to be made—in preference by means of a distinct storm outlet or outlets, or otherwise—that storm or rain-water in excess to the ordinary flow of sewage (where there is no separate system of drainage for such water) may be discharged direct from the sewers, or from the reservoir above named, into river or sea without passing through the tanks and filters, there being no necessity for purifying ordinary rain or storm water.

Before reaching and flowing into the deposit-tanks sewage and disinfecting-liquid are to be thoroughly mixed. The greater the amount of amalgamation and mixing between the sewage and disinfecting compound the greater is the effect produced as regards clarification, deodorization, and purification, and the smaller, comparatively, is the quantity of chemicals required for efficient treatment, and, consequently, the smaller is the cost. This thorough mixing and amalgamation of sewage and disinfecting agent may be effected, in preference, by means of revolving agitating-wheels in a mixing-chamber constructed for that purpose, or by letting sewage and disinfecting-liquid run together a sufficient distance in the sewer to produce the same effect, or by pumping sewage mixed with the disinfectant direct from a mixing-well into the tanks, or by means of other mechanical contrivances—for instance, by means of channels or culverts leading along or round the deposit-tanks, such conduits having brick or wooden partitions inserted at certain distances on their walls, so as to create an often-broken current by the mixed liquid winding and forcing its way along these troughs before entering the tanks, or by similar contrivances.

A set of three deposit-tanks will generally be found sufficient. More or less may have to be provided, according to the quantity of sewage to be treated. The width of the tanks should not be more than one-third to one-fifth of their length, and the depth should not exceed from four to five feet, so as to facilitate easy cleaning out. The bottom of the tanks ought to be slightly sloped, and to have an incline toward the sludge-outlet. Having particularly in view the daily emptying and cleaning of the tanks, sluices or valves or siphons should be provided to facilitate the drawing off of the purified water. Of the three tanks, two may be used together when the third tank has to be cleaned out, and provision is to be made that each tank may be filled separately, so that, when filled, the purified fluid may have time to rest and to settle, thereby producing a higher degree of clarification, deodorization, and purification; or the purified water may pass, after filling one tank, into another tank, and may be discharged direct from the second tank into river or sea, or onto land or filtering-beds, thus using two tanks only simultaneously; or the purified water may pass, after filling two tanks, into the third tank, so that all three tanks, or more, according to the number, may be used at the same time, having thus a continuous flow from one tank into another, sewage and disinfecting compound flowing into the first tank, and, after clarification, deodorization, and purification, the purified water flows from the third, or from the last tank, by means of floating self-acting outlets, which may be filled with coke or other filtering material, or over an ordinary overflow, or otherwise, onto the artificial filters, or onto the land, to be used for filtration or irrigation, or the purified water is discharged direct into river or sea.

The manipulation of daily cleaning out the deposit-tanks and the daily removal of the deposit enables me to use the precipitate resulting from the addition of the precipitation mixture, as described, underneath to the sewage a second time for the same purpose, and thereby—

First, I effect a considerable saving of chemicals required for the efficient clarification, deodorization, and purification of sewage.

Second, the precipitate ultimately produced is much richer in fertilizing ingredients, and constitutes a good manure, which quickly dries in the air.

Third, where land can be had for filtration or for irrigation, my arrangements solve the most difficult part of the sewage question—namely, the disposal of raw sewage and the disposal of the sludge resulting from precipitation, as described later on.

I will now give a description of my chemical treatment of sewage, and of the combination of chemicals used for the clarification, deodorization, and purification of the same.

Dealing with places near the sea, I use the following materials for the clarification, deodorization, and purification of sewage, namely: Lime and common gas-tar and sea-water from the incoming tide. These ingredients are mixed in the following manner: The lime is slaked with a sufficient quantity of sea-water, so as to produce the greatest possible amount of heat. When that heat has been obtained, and lime and sea-water are in the form of a paste the tar is added to the slaked lime, and both are worked together until they are intimately mixed, and the paste is all through of the same grayish color.

I proceed in the following way: For every one hundred pounds weight of lime I take the necessary quantity, in weight, of pure sea-water—if possible, from the incoming tide—for slaking the lime, and add five pounds, in weight, of tar (or more or less) to the lime when hottest. When a paste, as above described, has been formed, one pound, in weight, of the paste may be dissolved in or diluted with from ten to fifteen or twenty pounds, or more less, in weight, of pure sea-water. The paste of lime and tar and sea-water should be used for the clarification, deodorization, and purification of sewage in the proportion of from half a pound to one pound (or more or less) for every one hundred gallons of sewage, according to local circumstances.

The effluent water from sewage thus treated in the way as before described, and having sufficient time allowed to subside and to settle, may be, after filtering or without being filtered, according to locality, without causing any offense or nuisance, discharged into the sea or into a river.

Where there is no available space for artificial downward or upward filtration, for filtration through land, or for irrigation, there advantageously may be constructed at the overflow from the deposit-tanks an outlet-chamber or outlet-basin, and in this chamber or basin may be added to the effluent water, for further purification, a small quantity of a solution of perchloride of iron; or carbonic-acid gas may be forced into the purified water. This carbonic-acid gas produces extraordinary purification, and any excess of lime in the effluent will be precipitated as carbonate of lime, so that alkaline reaction is avoided.

Finally, a small vertical filter, composed of burnt ballast, or of any of the materials previously named, may be constructed, through which the effluent water may pass into river or sea.

Where sea-water is not obtainable I use, instead of sea-water, a combination of salts of magnesium, by preference calcined chloride of magnesium, with or without chloride of calcium, or the refuse liquor from salt-works calcined and dissolved in water.

As already mentioned, great difficulty has always heretofore been experienced in the easy, quick, and efficient disposal of the sewage-deposit resulting from chemical treatment and from precipitation, on account of its watery condition and the foul smell emanating from it, particularly in hot weather.

Now, the disinfecting compound which I use is in so far peculiar that the sludge produced is quite harmless as regards the development of noxious or offensive gases therefrom, if exposed even to a hot sun, and it dries very rapidly without employing artificial heat. Besides this, the sludge obtained from precipitation of the sewage matters may be used again for the same purpose, with almost equal effect as when applied first.

I make my arrangements for disposal of the sewage deposit in this way:

After treating the sewage one day with the disinfecting compound, which I call the "precipitation mixture," I use the deposit produced during that day, or part of it the next day for what I call the "irrigation mixture," in distinction from the precipitation mixture. The irrigation mixture I make up in this way and proportion: To one pound, in weight, of the precipitation mixture are put five pounds, in weight, or more or less, of the deposit produced by precipitation, and, when well mixed together, I dissolve or dilute every one pound of the whole mixture with about five pounds, or more or less, in weight, of water, by preference sea-water, if it can be had. This fluid I apply as my irrigation mixture to sewage for disposal on land, whether for irrigation or for filtering purposes.

It is desirable that the sewage and irrigation mixture should be thoroughly and well mixed together, and when this has been effected in the mixing-chambers, or otherwise, the sewage and irrigation mixture together may be sent direct onto the land without passing the deposit-tanks or filters, and thereby I effect a very considerable saving in chemicals, in labor, and in cost. By this means the great objection to irrigation with raw sewage is overcome, as my irrigation mixture prevents any smell arising from sewage; the cost of treating sewage is enormously reduced; the condition of the sewage deposit is rendered quite inoffensive, very compact, and it can be easily handled and removed. The quantity of the sewage deposit is, by this arrangement, reduced to a minimum. In fact, by judicious management and arrangements of tanks and land, no sewage deposit need accrue or accumulate on sewage-works carried out according to my plan, and the great difficulty of disposing of sewage-refuse is thus entirely overcome.

The effluent water produced by my process is pure enough to be used advantageously, and especially for road-watering, as it keeps the road longer in a moist state than ordinary water, and it lays the dust well. It may also be used for boilers, and for condensing purposes, and for various manufacturing purposes.

Having thus described the nature of my invention, and the manner of carrying out the same, I would have it understood that I claim—

The hereinbefore-described process of clarifying, deodorizing, and purifying sewage, which consists in treating the sewage with a disinfecting compound composed of a mixture of sea-water, or its specified equivalent, lime, and tar, substantially as set forth.

F. HILLE.

Witnesses:
   WILMER M. HARRIS,
   JOHN DEAN,
*Both of No. 17 Gracechurch street, London.*